United States Patent
Kudriavtsev et al.

(10) Patent No.: US 10,545,743 B2
(45) Date of Patent: Jan. 28, 2020

(54) ENHANCED PROGRAMMING LANGUAGE SOURCE CODE CONVERSION WITH IMPLICIT TEMPORARY OBJECT EMULATION

(71) Applicant: Oracle International Corporation, Redwood Shores, CA (US)

(72) Inventors: Petr Andreevich Kudriavtsev, Saint-Petersburg (RU); Vladimir Viktorovich Voskresenskii, Saint-Petersburg (RU)

(73) Assignee: Oracle International Corporation, Redwood Shores, CA (US)

( * ) Notice: Subject to any disclaimer, the term of this patent is extended or adjusted under 35 U.S.C. 154(b) by 126 days.

(21) Appl. No.: 15/706,297

(22) Filed: Sep. 15, 2017

(65) Prior Publication Data

US 2018/0081654 A1    Mar. 22, 2018

(30) Foreign Application Priority Data

Sep. 16, 2016   (RU) .................................. 2016137177

(51) Int. Cl.
*G06F 8/51* (2018.01)
(52) U.S. Cl.
CPC ...................................... *G06F 8/51* (2013.01)
(58) Field of Classification Search
None
See application file for complete search history.

(56) References Cited

U.S. PATENT DOCUMENTS

| 4,667,290 A | 5/1987 | Goss et al. |
| 5,768,564 A * | 6/1998 | Andrews ................... G06F 8/33 |
| | | 707/999.101 |
| 6,282,707 B1 * | 8/2001 | Isozaki ................... G06F 8/443 |
| | | 717/157 |
| 7,346,897 B2 | 3/2008 | Vargas |
| 7,500,229 B2 | 3/2009 | Tanaka et al. |
| 7,810,081 B2 | 10/2010 | Dickenson et al. |
| 8,032,860 B2 | 10/2011 | Piehler et al. |

(Continued)

OTHER PUBLICATIONS

Non-Final Office Action in U.S. Appl. No. 15/706,328, dated Jan. 2, 2019, 34 pages.

(Continued)

*Primary Examiner* — Philip Wang
*Assistant Examiner* — Rongfa P Wang
(74) *Attorney, Agent, or Firm* — Meyertons Hood Kivlin Kowert and Goetzel PC; Rory D. Rankin

(57) ABSTRACT

Systems, apparatuses, and methods for converting computer program source code from a first high level language to a functionally equivalent second high level language different from the first high level language. Source code in a first high level language that includes implicitly created temporary objects is analyzed. Source code in the second high level programming language is generated that is functionally equivalent to the source code in the first high level programming language. The second high level language does not support temporary objects. For temporary objects identified in the first high level source language, source code is generated to explicitly create and track a corresponding object within a similar scope. In addition, source code is generated to destroy the explicitly created object at a time that generally corresponds to destruction of the temporary object in the original source language.

20 Claims, 12 Drawing Sheets

(56) References Cited

U.S. PATENT DOCUMENTS

| | | | |
|---|---|---|---|
| 8,332,828 | B2 | 12/2012 | Vargas |
| 8,656,372 | B2 | 2/2014 | Vargas |
| 8,819,650 | B2 | 8/2014 | Barcia et al. |
| 9,086,931 | B2 | 7/2015 | Vargas |
| 9,524,175 | B2 | 12/2016 | Cimadamore et al. |
| 2006/0020919 | A1 | 1/2006 | King |
| 2007/0169040 | A1 | 7/2007 | Chen |
| 2008/0141219 | A1 | 6/2008 | Chinnici |
| 2008/0222616 | A1* | 9/2008 | Cheng .................. G06F 8/51 717/137 |
| 2009/0031291 | A1* | 1/2009 | Adams ................. G06F 8/51 717/137 |
| 2009/0055814 | A1 | 2/2009 | Gallop et al. |
| 2009/0265684 | A1 | 10/2009 | Fuchs et al. |
| 2010/0287539 | A1 | 11/2010 | Park et al. |
| 2011/0138373 | A1 | 6/2011 | Lane et al. |
| 2011/0167404 | A1 | 7/2011 | Liu et al. |
| 2012/0117547 | A1* | 5/2012 | Balakrishnan ............ G06F 8/24 717/136 |
| 2012/0159444 | A1 | 6/2012 | Agarwal et al. |
| 2014/0317609 | A1* | 10/2014 | Bauer ................. G06F 12/0261 717/158 |
| 2015/0020051 | A1 | 1/2015 | Rabinovitch et al. |
| 2016/0154673 | A1 | 6/2016 | Morris |
| 2017/0024193 | A1 | 1/2017 | Goubier |
| 2018/0081655 | A1* | 3/2018 | Kudriavtsev ............ G06F 8/30 |
| 2018/0275977 | A1* | 9/2018 | Kudriavtsev ............ G06F 8/51 |

OTHER PUBLICATIONS

Kudriavtsev et al., U.S. Appl. No. 15/725,808, entitled "Programming Language Source Code Conversion", filed Oct. 5, 2017, 57 pages.

Notice of Allowance in U.S. Appl. No. 15/725,808, dated Jun. 25, 2018, 8 pages.

Alomari et al., "Comparative Studies of Six Programming Languages", Apr. 2, 2015, 71 pages, https://arxiv.org/ftp/arxiv/papers/1504/1504.00693.pdf. [Retrieved Apr. 30, 2018].

Malabarba et al., "MoHCA-Java: a tool for C++ to Java conversion support", Proceedings of the International Conference on Software Engineering, Feb. 1999, 4 pages, http://web.cs.ucdavis.edu/~devanbu/dp.tex.pdf. [Retrieved Apr. 30, 2018].

Martin et al., "C to Java Migration Experiences", Proceedings of the Sixth European Conference on Software Maintenance and Reengineering, Mar. 13, 2002, 11 pages, http://citeseerx.ist.psu.edu/viewdoc/download?doi=10.1.1.9.2894&rep=rep1&type=pdf. [Retrieved Apr. 30, 2018].

Martin et al., "Strategies for Migration from C to Java", Proceedings of the Fifth European Conference on Software Maintenance and Reengineering, Mar. 14, 2001, 10 pages, https://pdfs.semanticscholar.org/5fcc/0219ea8ab9ab9f38eb27ce4ec31662366902.pdf. [Retrieved Apr. 30, 2018].

Saini et al., "An Analytical Study of C++ to Java Migration Strategy Using Conversion Tool", International Journal of Computer Application and Technology, Techno Publications, May 2014, pp. 75-78, http://www.academia.edu/7398578/An_Analytical_Study_of_C_to_Java_Migration_Strategy_Using_Conversion_Tool. [Retrieved Apr. 30, 2018].

Stricker, Scott, "Java programming for C/C++ developers", IBM Corporation, May 28, 2002, 47 pages, https://www.seas.upenn.edu/~cis1xx/resources/JavaForCppProgrammers/j-javac-cpp-ltr.pdf. [Retrieved Apr. 30, 2018].

Final Office Action in U.S. Appl. No. 15/706,328, dated Jul. 10, 2019, 31 pages.

* cited by examiner

```
// C++ Source
struct AAA {
  ~AAA() {}
  operator bool() { return true; }
};

AAA create() { return AAA(); } int main() {
  // create() returns temporary object AAA
  if (create())
      return 0;
  return 1;
}
```

1100

1102A

1104A

```
// Java
public static int main() {
  JavaCleaner $c$ = $createJavaCleaner();
  try {
  // create() returns temporary object with lifecycle bound to expression inside if-statement if ($c$.clean($c$.track(create()).$bool())) {
      return 0;
    }
    return 1;
  } finally {
    $c$.$destroy();
  }
}
```

ENHANCED PROGRAMMING LANGUAGE SOURCE CODE CONVERSION WITH IMPLICIT TEMPORARY OBJECT EMULATION

CROSS REFERENCE TO RELATED APPLICATIONS

This patent application claims priority to and the benefit of Russian Patent Application No. 2016137177, filed on Sep. 16, 2016, the contents of which are hereby incorporated by reference in their entirety.

BACKGROUND

Technical Field

This disclosure relates to computing systems, and more particularly to translating computer program source code from a first high level language to a second high level language.

Description of the Related Art

Most businesses today rely heavily on computer programs to efficiently and effectively run and manage their operations. For example, businesses rely on computer programs to manage inventory, distribution, accounting, employee management, and so on. Likewise, individuals rely on computer programs to manage and enhance their daily lives. For example, individuals may use various programs on desktop or mobile devices to create documents, manage their personal finances, and track their kids school activities. As such, computer programs are an indispensable part of our everyday lives.

Given the importance of computer programs in the society, maintaining such programs is of critical importance. When a program fails, the consequences can be far reaching. In addition to ensuring computer programs are properly maintained, it is often the case the programs are enhanced or modified to add new features. Such new features may be required to accommodate a new business process or procedure, or may simply be a feature deemed desirable by users of the computer program.

One important feature of modern computer programs are that they are typically written in a high level language, such as the C++ programming language or the Java® programming language (Java, or JAVA as used herein, is a registered trademark of Oracle and/or its affiliates). This high level language representation of a computer program is referred to as the source (program) code. High level programming languages are easier for people to read and understand than programs that are not written in a high level language. As used herein, a high level language refers to a programming language that is expressed in human-readable code that applies a common language specification for understanding human-readable words to express desired software functionality. Examples of high level languages include the programming languages C, C++, Java®, Python, JavaScript, PHP, as well as many others. Consequently, they are easier to maintain and enhance as described above. In addition, such languages allow for the expression of more abstract ideas and the creation of more functionality with less programmer effort.

While maintaining the original and revised source code is important, in some cases there is a desire to convert (or translate) source code from one high level language to another high level language. Some reasons for converting from one high level language to another high level language may include a move to a new development system or environment, a desire to take advantage of features not available in the original source code, a desire for more portable program code, or otherwise. While there exist some tools to aid in automating the conversion from one high level language to another, the resulting translations are often fraught with errors and deficiencies. Consequently, program code resulting from such a conversion may require extensive debugging and modification to be both syntactically correct and functionally equivalent to the original source code.

SUMMARY

Various embodiments of a system, apparatus, and methods for translating computer program code from a first high level language to a second different high level language are described herein. In various embodiments, source code in a first high level language that includes a plurality of name spaces is analyzed by a code conversion tool. A data structure representing the source code in the first language is generated that includes at least an identification of each symbol used within the source code in the first language. An identifier is generated for each of the identified symbols, wherein the identifier is globally unique within an entire codebase of the source code in the first high level language. Source code in the second high level programming language is generated that is functionally equivalent to the source code in the first high level programming language.

In addition to the above, the data structure representing the source code in the first language is analyzed to identify implicitly created temporary objects in the first high level language. New source code in the second high level language is generated to explicitly create an object and track the object. In various embodiments, the new source code to create and track the object is generated at a location in the new source code that has a location and scope similar to that of the implicitly created temporary object. In addition, new source code is generated in the second high level language to destroy the explicitly created object.

In some embodiments, analysis of the first high level language indicates a temporary object is created within a subexpression that is of a non-void return type. In such a case, creation of the corresponding object within the second high level language may be wrapped within a call to a method configured to create, track, and destroy the object. Conversely, if analysis of the first high level language indicates a temporary object is created within a subexpression that is of a void return type, then the method generates a call to a method to destroy the explicitly created object after a call to code that explicitly creates the object.

BRIEF DESCRIPTION OF THE DRAWINGS

FIG. 11 illustrates one embodiment of original source code and translated source code that emulates a temporary object in the original source code.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Figure 1:
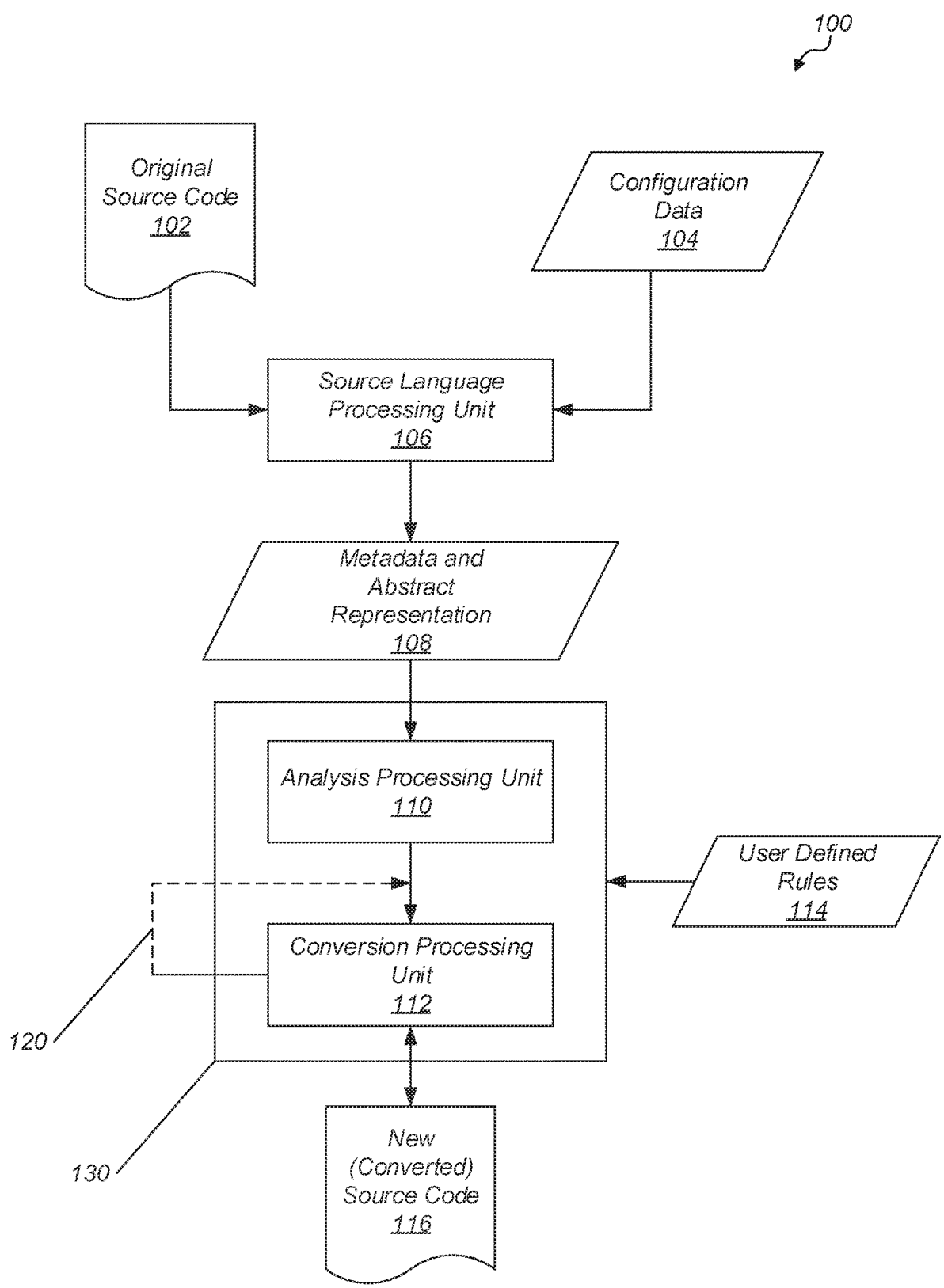
FIG. 1 illustrates an overview of a workflow for translating source code from an original high level language to a new high level language.

FIG. 1 illustrates a workflow for analyzing original source code in a high level language and converting (or translating) the original source code to a new source code in a second high level language that is functionally equivalent to the original source code. In the illustrated embodiment, various sources of data and units configured to process data are depicted and are discussed below.

As shown in FIG. 1, a source language processing unit (or tool) 106 is illustrated. In various embodiments, this source language processing unit 106 may comprise or other correspond to one or more units typically associated with a compiler frontend. To this end, the source language processing unit 106 includes functionality to analyze original source code 102 and produce metadata and/or one or more abstract representations of the original source code. Such metadata and abstract representation may include a symbol table and an abstract syntax tree. Those skilled in the art will appreciate a variety of other types of data may be produced by a compiler frontend or similar tool. In one embodiment, a publically available "Clang" based frontend tool is used for this purpose. Clang is a frontend compiler for C based languages such as C, C++, Objective-C, and others. Generally speaking, the source language processing unit 106 is configured to process source code corresponding to a particular high level language—such as the C programming language, the C++ programming language, the PHP programming language, the JAVA programming language, and so on. In the example shown, configuration data 104 may be used to configure the source language processing unit 106 in various ways. For example, the configuration data 104 may indicate a particular type of source code to be processed, potential optimizations to the code, and so on. Additionally, configuration data 104 may be used to indicate a type of target code that is ultimately desired. A variety of such options are possible and are contemplated.

Also illustrated in FIG. 1 are an analysis processing unit (or tool) 110 and a conversion processing unit (or tool) 112. In various embodiments, each of the units illustrated in FIG. 1 represent executable program code. Though it is to be understood that in other embodiments units or even portions of such units may represent hardware (e.g., circuitry designed to perform the functionality of the corresponding unit). For ease of discussion, each of units 106, 110, and 112, are depicted as separate and distinct unit. As such they may represent, and be implemented, as completely separate units. For purposes of discussion, the units 110 and 112 may be collectively referred to as a code conversion tool despite the fact they may be implemented as separate and distinct tools. In one embodiment, source language processing unit 106 represents one application (or tool) and analysis and conversion units 110 and 112, respectively, together form a second application (or tool) 130. Alternatively, all units may be included as part of a single tool or application.

As shown in the example, source language processing unit 106 takes as input original source code 102 and generates metadata and abstract representation 108. In various embodiments, the metadata and/or abstract representation includes an identification of each symbol used in the source code. In addition, symbols or statements with a particular meaning are identified. For example, a function declaration represents a statement (or collection of symbols or tokens) with particular semantic content and may generally be referred to herein as "semantic entities.". Symbols and statements with such semantic content are identified. Additionally, in some embodiments, a fully qualified name (FQN) may be generated for each symbol. As those skilled in the art understand, an FQN may be used in order to disambiguate otherwise identical symbols within a given namespace. Such an FQN will be further discussed below. This generated metadata and abstract representation is then analyzed by analysis processing unit 110. In one embodiment, analysis and processing unit 110 and conversion processing unit 112 are designed to analyze the data 108 with the goal of producing functionally equivalent source code in a high level language 116 other than the original source code 102. For purposes of discussion, the programming language represented by the original source code 102 will be the C++ programming language (the source language), and the new source code 116 generated by the application 130 will be the JAVA programming language (the target language). However, upon consideration of the present disclosure, those skilled in the art will appreciate that the principles, methods, and mechanisms described herein may be applied different source and target languages.

In one embodiment, the processing performed by the analysis processing unit 110 and the conversion processing unit 112 may be at least in part iterative. For example, as will be described in greater detail, analysis processing unit 110 may analyze the data generated by the source language processing unit 106. Based upon this analysis, the analysis processing unit 110 creates data that identifies structures and elements in the original source code 102 that require corresponding code in the new source code 116. Based upon this data, the conversion processing unit 112 generates corresponding source code 116. In various embodiments, the initially generated new source code 116 is not deemed fully complete until it has been analyzed further. Such analysis may be performed by unit 112 and/or unit 110. If it is determined that the generated source code 116 requires modification, then conversion processing unit 112 may iterate 120 or otherwise modify the new source code. In various embodiments, reasons for modifying the new source code 116 may include determining the initially generated new source code 116 includes syntax errors, is not functionally equivalent to the original source code 102, or some other reason that prevents the new source code 116 from being a usable valid representation of the original source code 102. Similar to the configuration data 104, user defined rules 114 or other configuration data may be used to control the analysis processing unit 110 and/or conversion processing unit 112. Once it is determined that processing by the analysis 110 and conversion processing unit 112 are complete, the workflow of FIG. 1 is complete. In addition to generating corresponding programming statements in the new source code, comments in the original source may also be included in the new source code.

Figure 2:
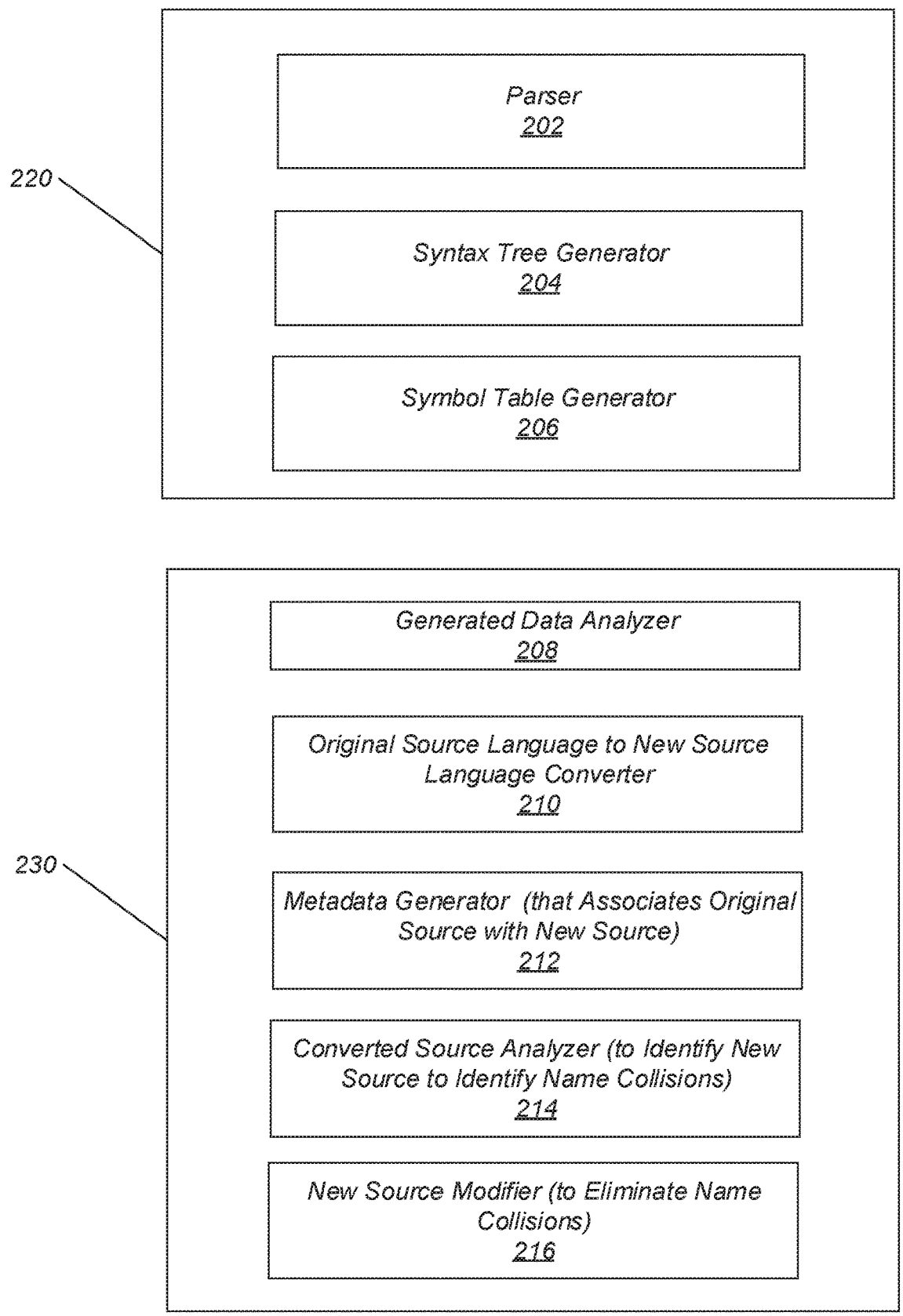
FIG. 2 illustrates one embodiment of program code analysis and conversion elements that may be used in the workflow of FIG. 1.

FIG. 2 illustrates one embodiment of elements or units (or "subunits") corresponding to the source language processing unit 106, the analysis processing unit 110, and conversion processing unit 112 of FIG. 1. In the example shown, block 220 illustrates some unit that may be included in the analysis processing unit 110 of FIG. 1. In this example, the included units include a parser 202, syntax tree generator 204, and symbol table generator 206. It is noted that the analysis processing unit 110 may include additional and/or different functionality not explicitly called out in FIG. 2. For example, it may include functions to perform syntax analysis, semantic analysis, and otherwise.

Block 230 of FIG. 2 illustrates one embodiment of components or units corresponding to the analysis processing unit 110 and conversion processing unit 112 of FIG. 1. In this example, the components include a generated data analyzer 208 to analyze data generated by one or more components of block 220. Also included is an original source language to new source language converter 210 and metadata generator 212 for use in supporting generation of the new source code and associating the new source code with the original source code. FIG. 2 also illustrates inclusion of a converted source code analyzer 214 to analyze the generated new source code as discussed above. Finally, a new source code modifier component 216 is included to modify generated new source code as deemed necessary to ensure correct syntax and functional equivalence with the original source code. In some embodiments, other units or components may be present to generate executable code (e.g., bytecode or an executable binary) from the newly generated new source code As discussed above, it is a goal of the workflow of FIG. 1 to produce a usable and functionally equivalent new source code that corresponds to the original source code. However, there are a number of factors that hinder the generation of such new source code. One source of such errors is the existence of features in the programming language of the original source code that have no direct equivalent in the programming language of the new source code. In the following, a variety of such scenarios will be discussed using the C++ programming language as the original programming language and the JAVA programming language as the target programming language.

Figure 3:
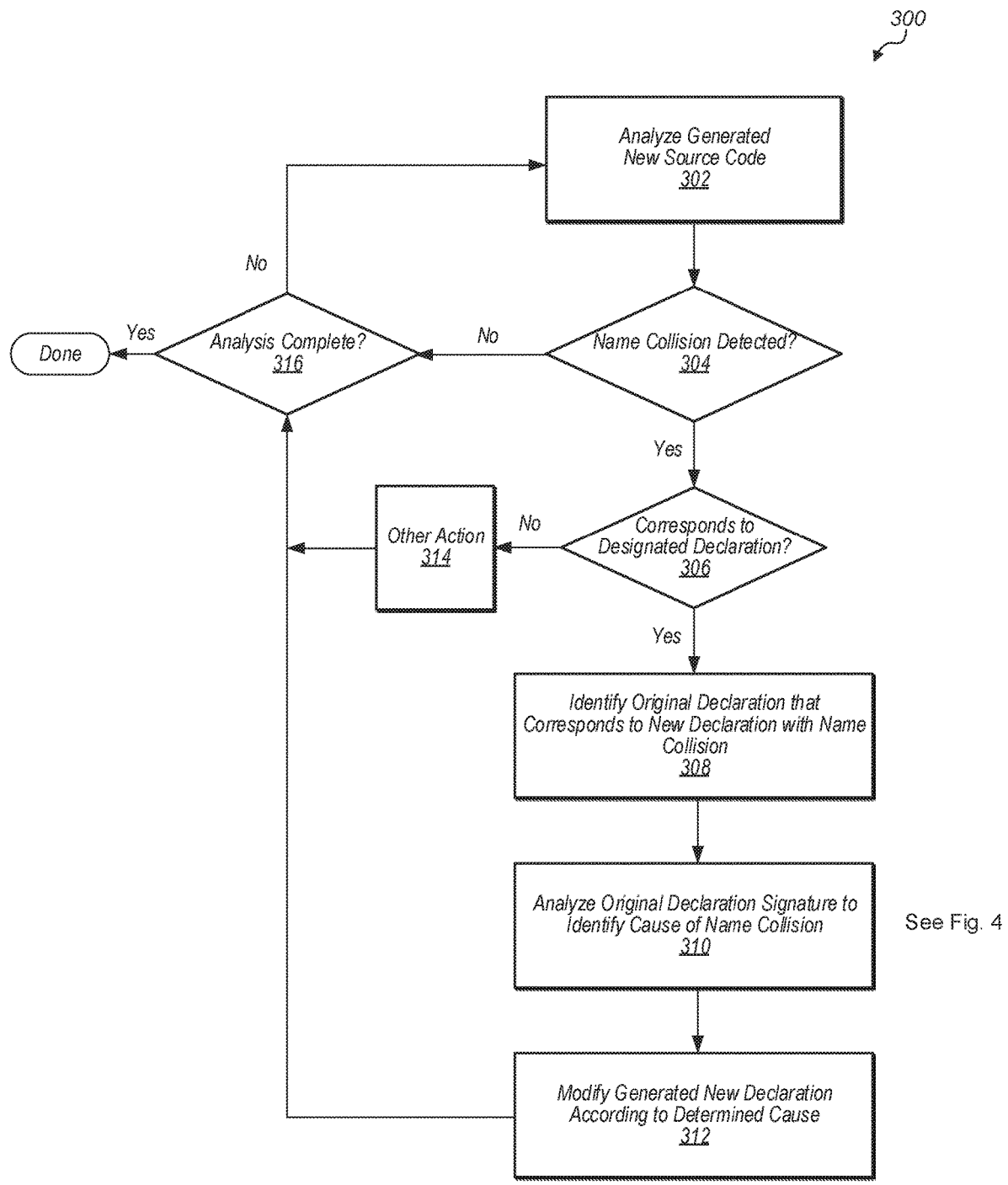
FIG. 3 illustrates one embodiment of a method for detecting name collisions in translated source code and modifying the translated source code to eliminate the name collision.

FIG. 3 illustrates one embodiment of a method for detecting the existence of a name collision in the newly generated source code, determining a cause of the name collision, and modifying the newly generated source code to correct the name collision. As used herein, a "name collision" refers to the use of a same identifier (name) for two different entities (e.g., variables, functions, classes, etc.) within a given namespace. When such a name collision occurs, ambiguity as to which entity is meant occurs and compilation of the program code may not be successfully completed. In the example of FIG. 3, the method 300 begins with the analysis of the generated new source code 302. It is noted that the generated new source code may be represented in a variety of ways in various embodiments. In some embodiments, generated new source code is written to storage (e.g., disk or otherwise) and subsequently accessed for later analysis. In other embodiments, the generated new source code may be resident in memory in a format that corresponds directly to the program code to ultimately be written. In still other embodiments, a memory resident version of the generated new source code may be in a format that differs from the of the ultimately produced source code. For example, various data structures may be used to represent and/or store different types of program statements. Such data structures themselves may then be analyzed in block 302 of method 300. These and other embodiments for the source code described in block 302 are possible and are contemplated.

As shown in FIG. 3, a determination is made as to whether a name collision is detected (block 304). In one embodiment, a name collision may be detected when two distinct declarations use the same identifier or name. As used herein, a declaration specifies a property (or properties) of an identifier such as whether it represents a function, class, variable, etc. If a name collision is detected, a determination is made as to whether the name collision corresponds to a designated declaration type (block 306). In various embodiments, a designated declaration type corresponds to a predetermined type (e.g., a function or template). Determining the declaration type may include analyzing either or both of the declaration in the original source code and the generated declaration in the new source code. If the name collision does correspond to a designated declaration type, then the declaration in the original source code is identified (block 308). The original declaration signature is analyzed (block 310) to determine the cause of the name collision as will be discussed further in FIG. 4. Having determined the cause of the name collision, the new source code is modified (block 312) to eliminate the name collision. In various embodiments, the modification that is made creates a new name for the colliding name in the new declaration and all instances of that name are provided the new name in the new source code. As will be described, in some embodiments the new name that is generated for the colliding name in the new source code varies in dependence on the determined cause.

If in block 304 a name collision is not detected, then analysis continues until complete (block 316). Additionally, if a name collision is detected that does not correspond to a designated declaration type (block 306), then an alternative action is taken (block 314). In some embodiments, the other action 314 may include generating comments and/or partial code in the new source code identifying a region where a programmer is required to manually modify the programming code.

Figure 4:
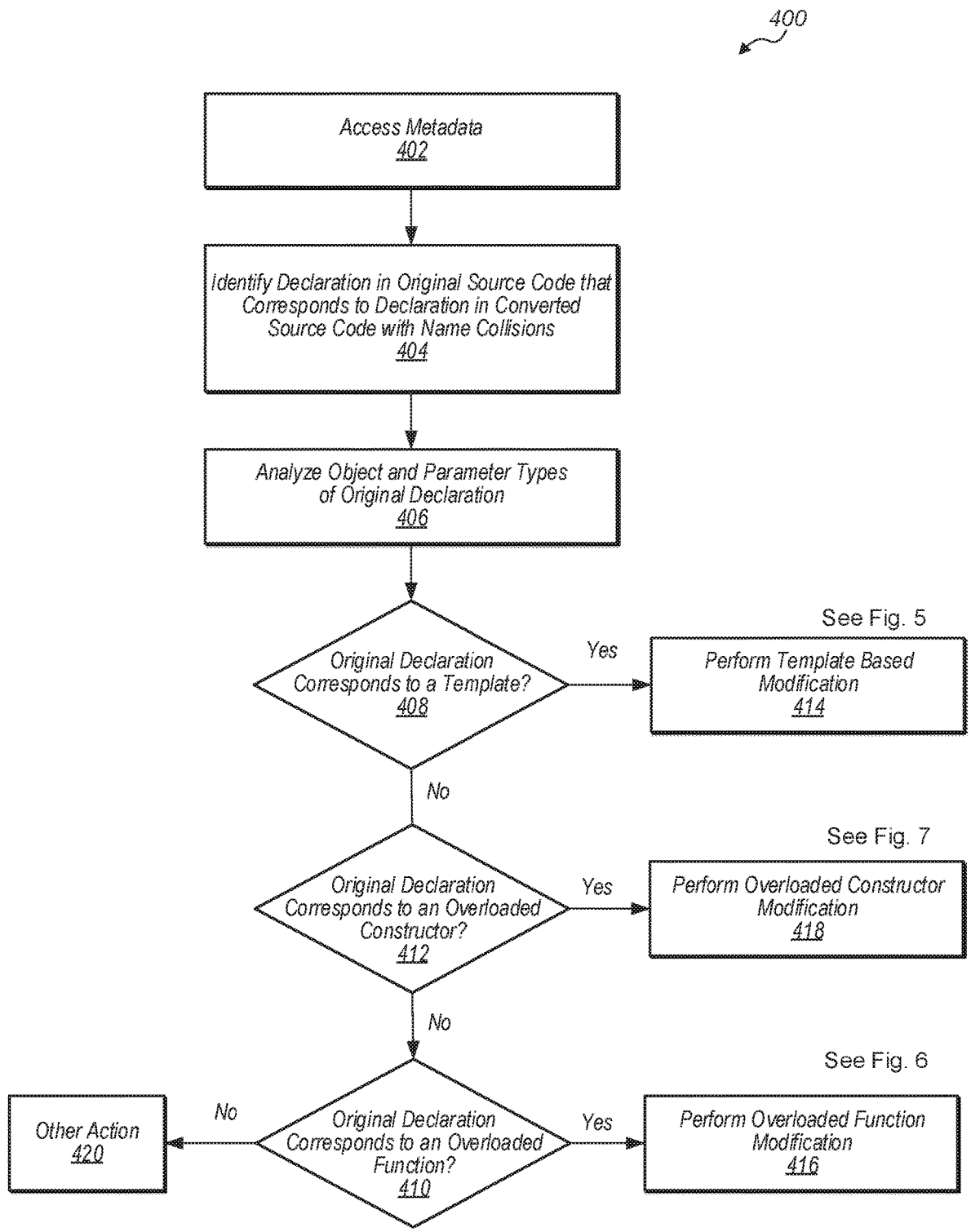
FIG. 4 illustrates one embodiment of a method for determining a cause of a name collision in translated source code and taking a corrective action.

Turning now to FIG. 4, one embodiment of a method 400 for determining a cause of a name collision is illustrated.

Having determined a name collision exists, the method includes accessing metadata (e.g., metadata 108 of FIG. 1 and/or metadata generated by analysis processing unit 110 and conversion processing unit 112). In various embodiments, the metadata includes data usable to map the colliding declaration in the new source code to the programming statements in the original source code from which they were generated. As such, the declaration in the original source code is identified (block 404). The object and parameter types of the original declaration are analyzed (block 406) and a determination is made as to whether it corresponds to a designated type.

Depending on the determined type of declaration, one of a variety of modifications are made to the colliding name in the new source code. For example, if the declaration type corresponds to a template (block 408), then a template based modification is performed (block 414). Further details regarding template based modifications are discussed in relation to FIG. 6. If the original declaration corresponds to an overloaded constructor in the original source code (block 410), then an overloaded constructor based modification is performed (block 418). Overloaded constructor based modifications are discussed further in related to FIG. 7. Finally, if the original declaration corresponds to an overloaded function in the original source code that is not a constructor (block 412), then an overloaded function based modification is performed (block 416). Overloaded constructor based modifications are discussed further in relation to FIG. 6. If none of these scenarios is detected, then another action (block 420) may be performed. This other action may include adding comments and/or partial code in the new source code indicating manual modification is required.

Figure 5:
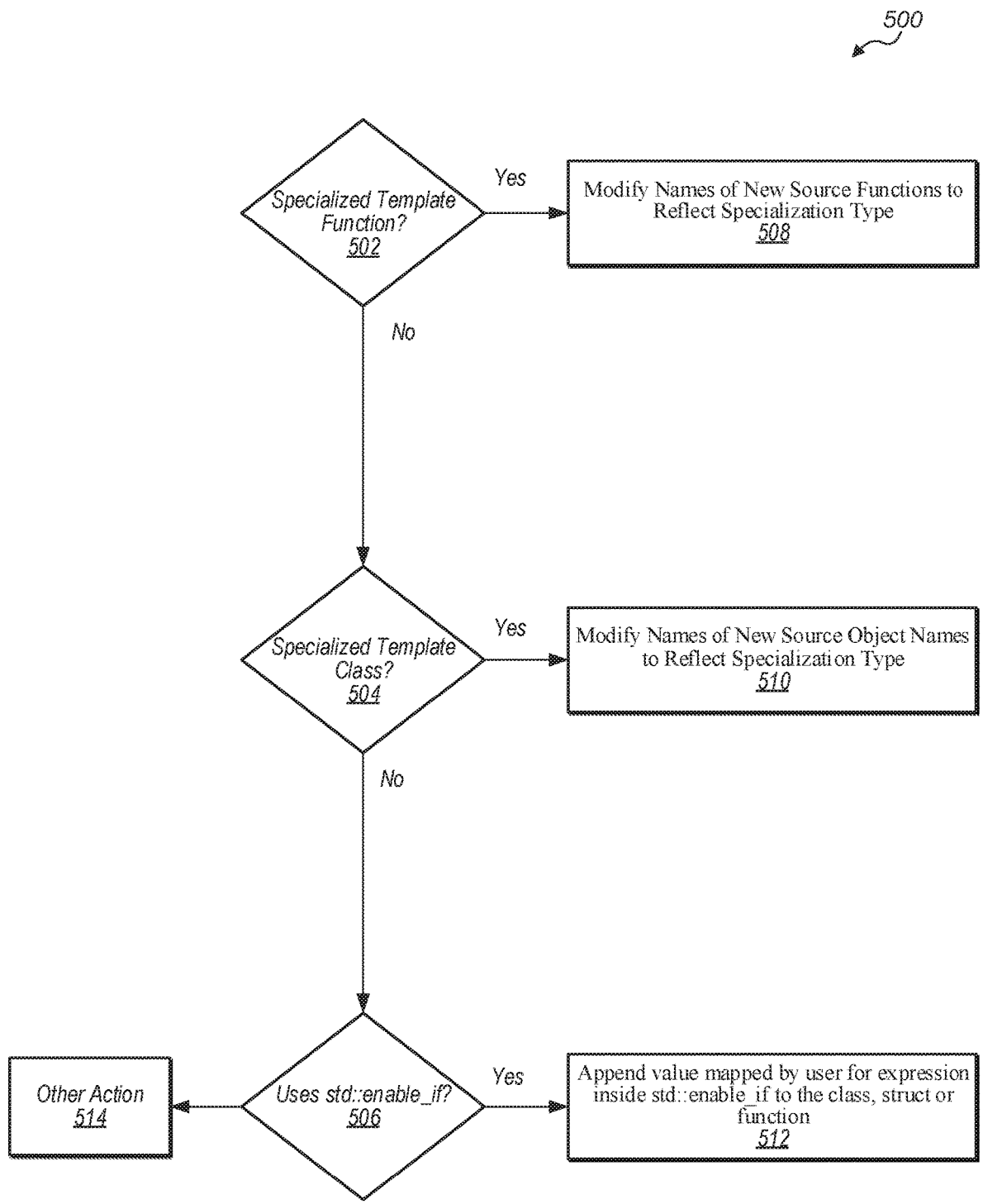
FIG. 5 illustrates one embodiment of a method for identifying a type of template based cause for a name collision and taking a corrective action.

As noted above, if the declaration in the original source code corresponds to a template, then a template based modification is performed. FIG. 5 illustrates one embodiment of a method for identifying and modifying three types of template declarations. When converting the original source code from the C++ programming language to the JAVA programming language, various modifications may be needed to account for differing features of the two programming languages. For example, if the original declaration corresponds to a specialization of a template function (block 502) as shown in the example below, a direct equivalence is not available in the JAVA programming language. Template specialization in C++ allows the template code to be customized for a set of template arguments.

Example of Template Specialization in C++

```
template <typename T> void boo(T var);   //primary
template <> void boo(int var);           //specialization
```

In the above example, the first declaration represents the primary template declaration and the second declaration represents a customization (or specialization) of the template for the case when the type T is int. In order to create a functional equivalent of the above code in JAVA, while addressing the lack of equivalent for template specialization, the above may be replaced by the following in JAVA:

Example of JAVA Conversion for Template Specialization in C++

```
public static </* typename */ T> void boo$T(T var) { }
public static void boo$Int(int var) { }
```

In the above example, the declaration name "boo" has been modified to indicate the specialization type of function. More generally, the modified name is original_name<separator>Type. In this example, the separator used is the "$" sign which is valid for use in an identifier name in the JAVA programming language and often generated by JAVA compilers. In the first declaration, the type T has been appended to the name "boo". Similarly, in the second declaration, the type Int has been appended to the name "boo". In addition, the modification to the first declaration inserts the comment "/* typename */" to provide the reader a more explicit indication as to the original declaration in the original C++ and more closely resemble the original syntax. This may aid readers who are more familiar with one of the languages then the other.

If the original declaration corresponds to specialization of a template class (block 504) as shown in the example below, then modification of the code for the JAVA source will be required.

Example of Specialization of a Template Class in C++

```
template <typename T> struct AAA { };
template <> struct AAA<int> { };
```

In the above example, the first declaration represents the primary template declaration and the second declaration represents a customization (or specialization) of class for the case when the type T is void. In order to create a functional equivalent of the above code in JAVA, while addressing the lack of equivalent for template class specialization, the above may be replaced by the following in JAVA:

Example of JAVA Conversion for Template Class Specialization in C++

```
public class/*struct*/ AAA$T </*typename*/ T> { }
public class/*struct*/ AAA$Int { }
```

In the above example, the class name "AAA" has been modified to indicate the specialization type. More generally, the modified name is original_name<separator>Type. In this example, the separator used is the "$" sign as in the above case. In the first declaration, the type T has been appended to the name "AAA". Similarly, in the second declaration, the type Int has been appended to the name "AAA". In addition, the generated code includes the comment "/* struct */" to indicate the nature of the original object (struct) which is not supported by the JAVA programming language. Additionally, the comment "/* typename*/" is added to the first declaration to further indicate the nature of the original declaration.

If the original declaration corresponds to specialization of a template (block 506) that uses the "std::enable_if" functionality of C++ as shown in the example below, then modification of the code for the JAVA source will be required.

Example of Specialization of Template with std::enable_if in C++

```
template <class T, class Enable = void>
class A { };
template <class T>
class A<T, typename
std::enable_if<std::is_floating_point<T>::value>::type> { };
```

In the above example, an "enable_if" switch is included. Enable_if is, effectively, a compiler switch that can be used in a scenario such as that above where function overloading is combined with templates. As those skilled in the art understand, enable_if allow a function template or a class template specialization to include or exclude itself from a set of matching functions or specializations based on properties of its template arguments. In order to create a functional equivalent of the above code in JAVA, the above may be replaced by the following in JAVA:
Example of JAVA Conversion for Template with std:enable_if in C++

```
public class A</*class*/ T /*, class Enable = void*/> { }
public class A$IsFloatingPoint { }
```

Here, two classes are created in JAVA. As seen, the first is a class of type T and the second is modified by adding "IsFloatingPoint" to the class name A to reflect the C++ nomenclature "is_floating_point".

Finally, if none of conditions 502, 504, or 506 are true, then a non-designated template type is detected and another action (block 514) taken. As above, this other action may include generating comments and/or partial code indicating manual modification is required.

Figure 7:
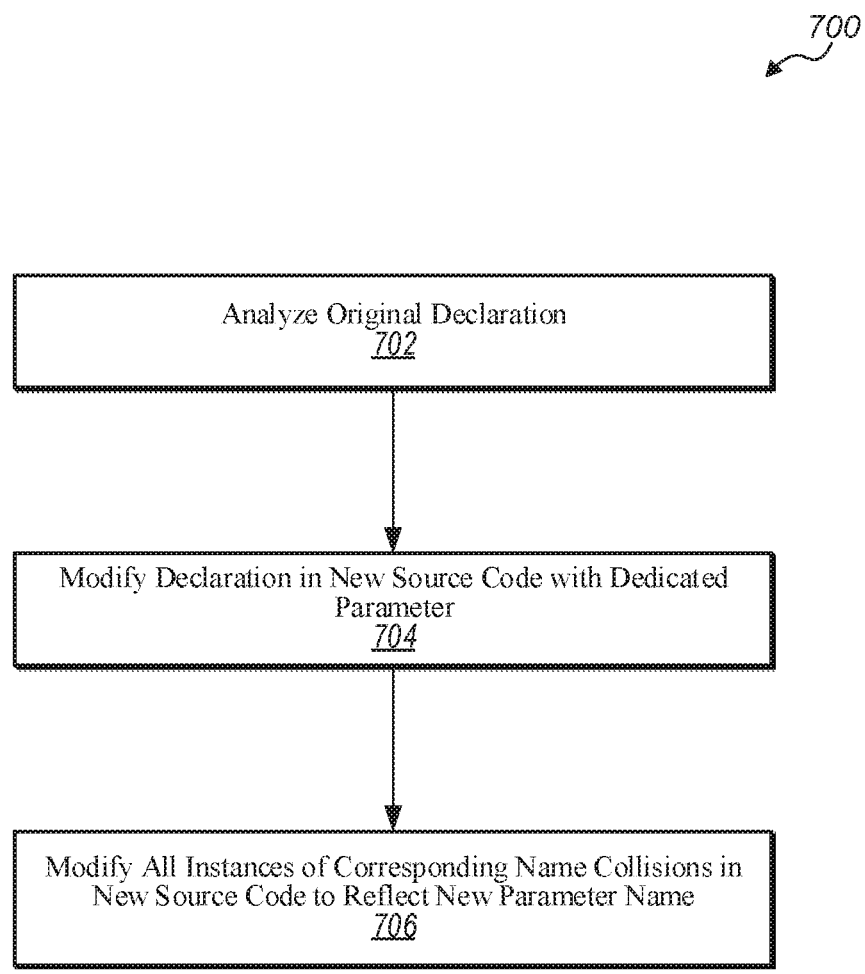
FIG. 7 illustrates one embodiment of a method for correcting name collisions due to overloaded constructors.

In block 410 of FIG. 4, a determination was made as to whether the original declaration corresponds to an overloaded constructor. If so, then a modification corresponding to an overloaded constructor is performed (block 418). FIG. 7 illustrates one embodiment of a method 700 for performing an overloaded constructor based modification. In the illustrated embodiment, the original declaration is analyzed (block 702) and the declaration in the new source code is modified using a dedicated parameter (block 704). Finally, all calls of the colliding constructor in the new source code are modified to the call with the extra dedicated parameter (block 706). In the sample C++ code below, an overloaded constructor is illustrated.
Example of Overloaded Constructors in C++

```
struct AAA {
    enum {UNSIGNED, SIGNED} kind;
    AAA(int param) { kind = SIGNED; }          //constructor 1
    AAA(unsigned int param) { kind = UNSIGNED; }  //constructor 2
};
```

As seen in the above, two constructors are declared with different parameters. The approach here is similar to that above for overloaded functions described below. However, instead of modifying the name a dedicated parameter ("dparam") is used to distinguish the constructors. In one embodiment, the type of the dedicated parameter consists of the prefix JD$ (which may, for example, standing for "JavaDifferentiators") and a postfix which is a combination of Java spellings of the collided parameters. For example, the following represents an embodiment of a JAVA conversion for the above C++ code:
Example of JAVA Conversion for Overloaded Constructors in C++

```
public class/*struct*/ AAA {
    public Kind kind;
    public AAA(JD$Int _dparam, int param) { kind = Kind.SIGNED; }
    public AAA(JD$UInt _dparam, /*uint*/int param) { kind =
        Kind.UNSIGNED; }
}
```

Figure 6:
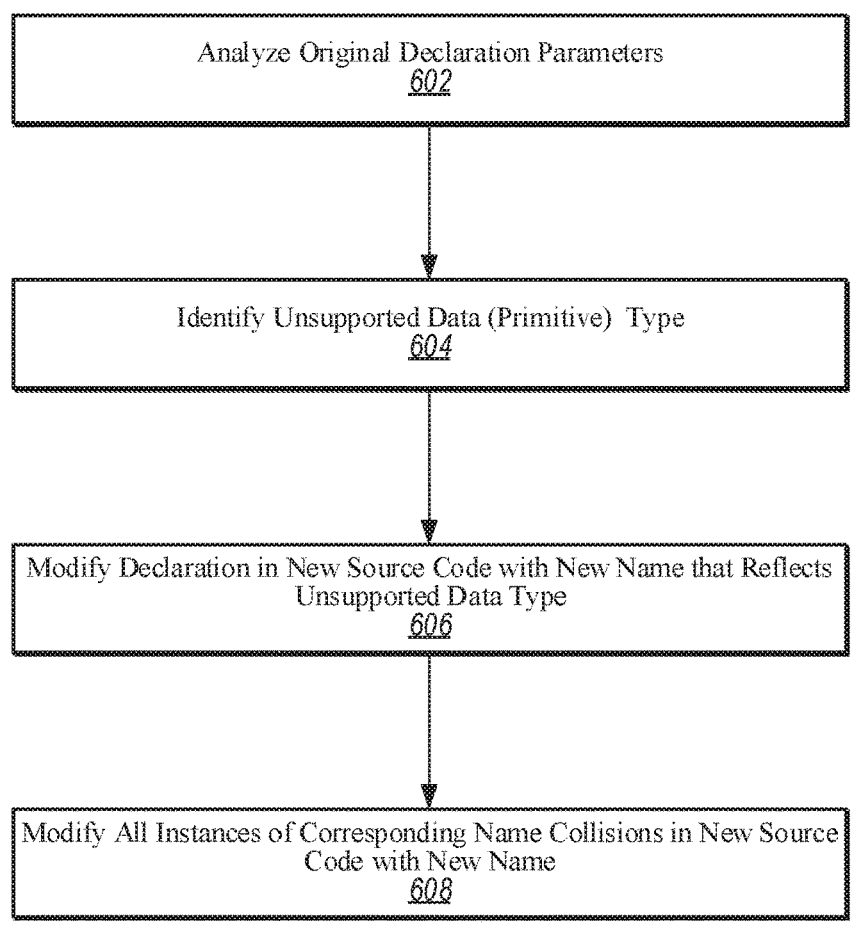
FIG. 6 illustrates one embodiment of a method for identifying and correcting name collisions due to overloaded functions.

Finally, in block 412 of FIG. 4, a determination was made as to whether the original declaration corresponds to an overloaded function that is not a constructor. If so, then a modification corresponding to an overloaded function is performed. FIG. 6 illustrates one embodiment of a method 600 for performing an overloaded function based modification. In block 602, the original declaration signature is analyzed and an unsupported data type is identified (block 604). Having identified the unsupported data type, the new source code declaration is modified by altering its name to reflect the unsupported data type (block 606). Finally, all instances of the function in the new source code are modified to the new name (block 608).

In the sample C++ code below, an overloaded function is illustrated.
Example of Overloaded Function in C++

```
void foo(int x){ }
void foo(unsigned int x){ }
```

In the above example, two functions named "foo" are declared, each having a different parameter type. The second parameter type, unsigned integer, is not supported in the JAVA programming language. Consequently, a straightforward conversion of these two function declarations may produce the following:

```
public static void foo(int x) { }
public static void foo(int x) { }
```

As can be seen in the above converted code, the unsigned integer type has been replaced with the type int. However, this results in two declarations with identical signatures and a collision results. In order to address this scenario, the following conversion may be used:
Example of JAVA Conversion for Overloaded Function

```
public static void foo__int(int x) { }
public static void foo__uint(/*uint*/int x) { }
```

As can be seen in the above converted code, two distinctly named functions have been generated to replace the overloaded C++ functions. In this example, each function name has been modified by adding an indication of the type of the original parameter. The first has appended the type "int" to the name "foo", and the second has appended the type "unit" (representing unsigned int). In this case the separator "_" was used in the name modification to distinguish from the "$" separator for the cases above involving template based modifications. In addition, a further comment was added to the parameter list of the second declaration to indicate the original declaration included the keyword "unsigned" and has now been removed.

In addition to the above, there are other features in C++ that are not supported in the JAVA programming language. One such feature is the implicitly created temporary object. In C++, objects may be created implicitly. In addition to the creation of such temporary objects, the lifecycle of these temporary objects is handled implicitly in C++. In contrast, objects in JAVA must be created explicitly. Because temporary objects in C++ are involved into computational processes, they must be emulated in the converted JAVA source code to ensure functional equivalence. Likewise, because the implicit calls to constructors and destructors for temporary objects can have side effects, these must be emulated as well.

In a language like C++, temporary objects are created with calls to appropriate constructors or conversion operators and therefore an analysis of such code can identify these calls. In various embodiments, as discussed below, an analysis of a data structure such as an Abstract Syntax Tree (AST) is performed to identify these calls. As will be described, the AST built from C++ code contains identifiable calls which create temporary objects. By analyzing the AST, it is possible to identify the places where such objects are created and generate code to call an appropriate JAVA constructor or method explicitly to create a corresponding object. As described below, a dedicated class (referred to as "Java-Cleaner" herein) is created for the purpose of tracking created objects and destroying them as appropriate. For example, in one embodiment a "track" method is created to track objects that need to be destroyed. An example, of such a class to track temporaries which must be destroyed in future is as follows:

```
// See CXXBindTemporary in Clang C++ AST
// @param <T>
// @param "temporary" object to destroy
// @return temporary itself
//
public <T> T track(T temporary);
```

In addition to a method to track objects that need to be destroyed, an overloaded "clean" method for possible types in JAVA code is created. In one embodiment, a clean method is created for every primitive type as well as a generic clean method. The following sample code illustrates one such embodiment:

```
// Destroys tracked temporaries.
// See ExprWithCleanups in Clang C++ AST.
//
// @param <T>
// @param "exprValue" value which must be forwarded
// @return passed value (exprValue)
//
public <T> T clean(T exprValue)
```

Generally speaking, the method and mechanism for emulating temporary objects in the new (target) source language includes analyzing the AST (or other data structures and/or metadata) produced by a frontend type tool to identify places where temporaries are created. In addition, the minimal scope needed to emulate the lifetime of the temporary object is also identified. Then calls to constructors of temporary objects are wrapped within a call to the above described "track" method. In this manner, an object is both explicitly created and registered/tracked by the track method. In addition, "clean" methods are placed at points where destruction of temporaries is to occur. If a subexpression has a non-void type, then it is placed inside the call to the clean (i.e., to destroy the object) method as illustrated below. If a subexpression has a void type, the call to clean is placed right after the statement which contains the point at which temporaries are destroyed (the only exception is a return-statement of a function with void return type). The following illustrates an example of this approach. First, original C++ source code is shown. Then, corresponding JAVA source code is shown. In these examples, the clean( ) method is placed within a try statement. In this manner, destruction of the object is assured by a call to destroy( ) if the try fails for some reason.

```
/****************************************************/
/*************************** C++ ***************************/
/****************************************************/
struct AAA
{
        ~AAA( ) { }
};
static void foo(bool BVal, AAA a)
{
        if (BVal)
        {
            // The call to foo( ) includes a parameter of type AAA which creates
            // a temporary object.
            foo(false, a);
        }
}
static int boo(bool BVal, AAA a)
{
        if (BVal)
        {
            // The call to boo( ) includes a parameter of type AAA which creates
            // a temporary object.
            return boo(false, a);
        }
        return 0;
}
/****************************************************/
/*************** JAVA corresponding to the above C++ **************/
/****************************************************/
public static void foo(boolean BVal, AAA a)
{
  if (BVal)
  {
        // JavaCleaner is created in the smallest possible scope
        JavaCleaner $c$ = $createJavaCleaner( );
```

```
            try
            {
                    // The parameter "a" is copied to the temporary, so it must be tracked.
                    foo(false, $c$.track(new AAA(a)));
                    // Function foo( ) is of void type and returns nothing, so it is not possible to
                    // wrap call of foo( ) with call of clean( ) method. Therefore the call of the
                    // clean( ) method is the next statement after calling foo( ) above.
                    $c$.clean( );
            }
            finally
            {
                    $c$.$destroy( );
            }
    }
}
public static int boo(boolean BVal, AAA a)
{
    if (BVal)
    {
            JavaCleaner $c$ = $createJavaCleaner( );
            try
            {
              // In this case the subexpression has a non-void (int) type. Therefore, the call to
              // boo( ) is placed inside the call to the clean method as shown below. Otherwise,
              // the call to clean (i.e., to destroy the object) is placed right after the statement
              // which contains the point at which temporaries are destroyed as in the example
              // above. The clean method destroys all tracked objects and returns its argument
              // as is.
              // Parameter "a" is copied to the temporary, so it must be tracked.
              return $c$.clean ( boo(false, $c$.track(new AAA(a))) );
            }
            finally
            {
                    $c$.$destroy( );
            }
    }
    return 0;
}
```

It is noted that in other embodiments, rather than using the above discussed try-finally constructs, the converted code may use try-with-resources constructs supported in various versions of the JAVA programming language. Generally speaking, the try-with-resources statement is a try statement that declares one or more resources. A resource is an object that must be closed after the program is finished with it. The try-with-resources statement ensures that each resource is closed at the end of the statement. Below is an illustration using the try-with-resources approach.

```
/**************************************************************/
/***************************** C++ ***************************/
/**************************************************************/
struct AAA
{
    ~AAA( ) { }
};
static void foo(bool BVal, AAA a)
{
            if (BVal)
            {
                    // The call to foo( ) includes a parameter of type AAA which creates
                    // a temporary object.
                    foo(false, a);
            }
}
/**************************************************************/
/*************** JAVA corresponding to the above C++ **************/
/******************** Using try-with-resources *******************/
/**************************************************************/
public static void foo(boolean BVal, AAA a)
{
            if (BVal)
            {
                    // JavaCleaner is created in the smallest possible scope
                    // The try statement declares a resource/object that must be closed
                    // on completion.
                    try(JavaCleaner $c$ = $createJavaCleaner( );)
```

```
{
  // The parameter "a" is copied to the temporary, so it must be tracked.
  foo(false, $c$.track(new AAA(a)));
  // Function foo( ) is of void type and returns nothing, so it is not possible to wrap
  call of foo( ) with call of clean( ) method. Therefore the call of the clean( ) method
  is the next statement after calling foo( ) above.
  $c$.clean( );
}
```

Using the above try-with-resource approach, a single try-with-resource statement can manage multiple resources, which can lead to further reductions in the size of the translated code since source-level nested try-finally blocks can be eliminated. In various embodiments, either or both of the try-finally and try-with-resources approach may be used as desired.

Figure 8:
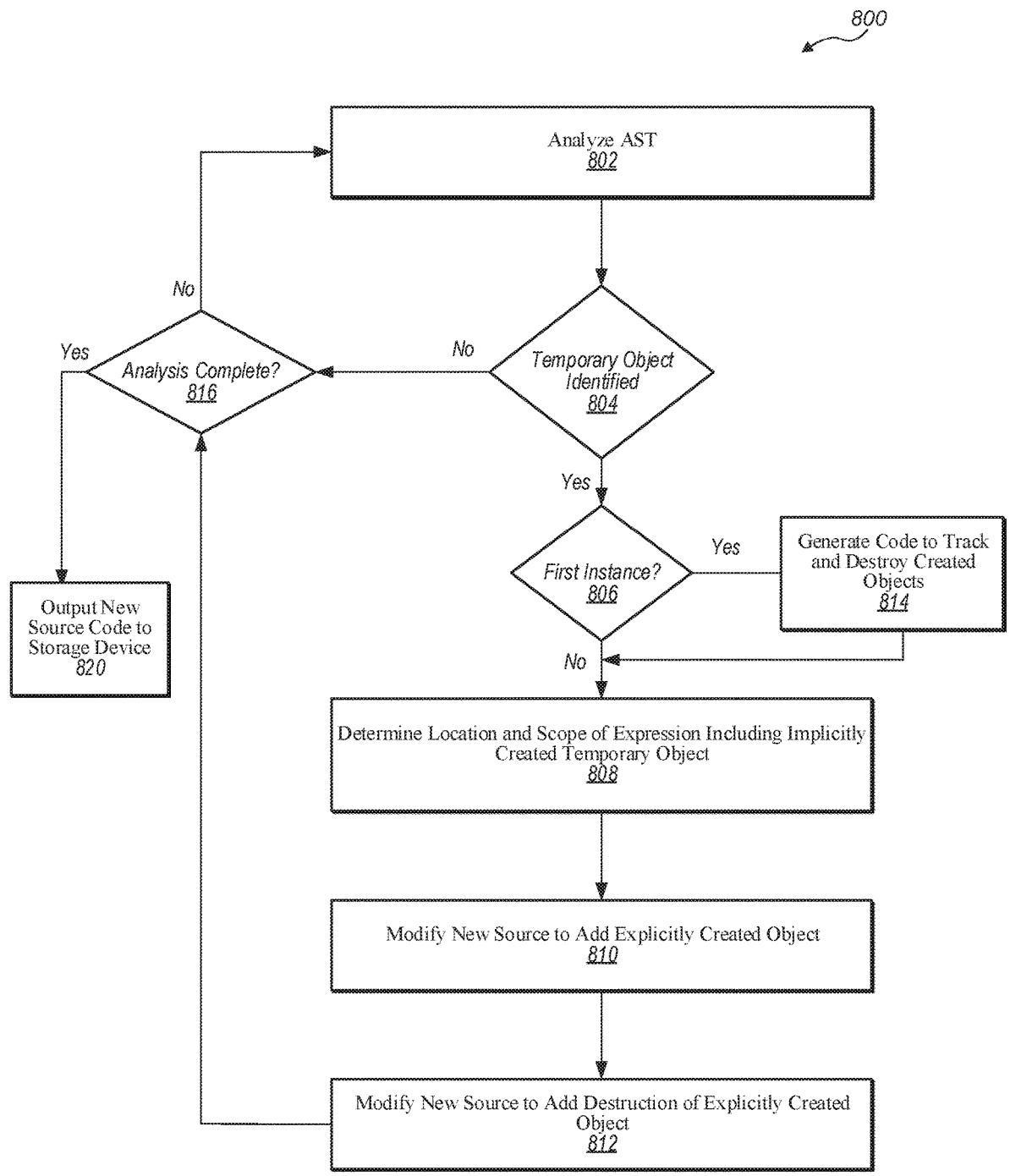
FIG. 8 illustrates one embodiment of a method for identifying temporary objects in original source code and modifying the translated source code to emulate the functionality of the temporary objects.

FIG. 8 illustrates one embodiment of a method 800 for converting C++ source code with implicitly created temporary objects to JAVA source code. In the embodiment shown, the abstract representation (e.g., an abstract syntax tree) generated by the source language processing unit (e.g., unit 106 of FIG. 1) is analyzed (block 802). In various embodiments, analysis may include other and/or different metadata associated with the processing of the original source code. In one embodiment, the source language processing unit is configured to analyze C++ programming code. During analysis of this representation, a temporary object may be identified (block 804). Additional details concerning this identification will be described in relation to FIG. 10. If such a temporary object is not identified and analysis is not complete (block 816), analysis continues (block 802). Otherwise, if analysis is complete (block 816), the newly generated source code is output for storage on a storage device (block 820). In some embodiments, the new source code may be output for storage as it is generated. Various such alternatives are possible and are contemplated.

In the event a temporary object is identified (block 804), a determination may be made as to whether this is the first instance (block 806) in which a temporary object is detected. If this is the first instance detected, then program code to track and destroy objects in the new source code is generated (block 814). This program code in the new source code is configured to track objects that are created to emulate temporary objects in the original source code. For example, the program code to track such objects may register an object when it is created. Registration of the object is maintained until such time as the object is destroyed. By reviewing objects that have been registered (e.g., in a list or other data structure), objects that remain alive can be identified and destroyed as needed. This code may serve to ensure objects are destroyed in the event an object otherwise fails to be destroyed due to an exception or other condition during program execution.

Subsequent to generating the tracking and destruction code (block 814), or if this is not the first instance of a temporary object (block 806), the location, scope, and context of the expression that results in the creation of the temporary object is determined through analysis of the above described abstract representation and/or other metadata (block 808). Having determined the location, scope, and context of the expression in the original source code, the new source code is modified at a corresponding location by adding program code to explicitly create an object (block 810) most closely resembling the temporary object type. That is to say, the explicitly created object in the new source code is of a type most closely analogous to that of the original temporary object. For example, if original C++ source code declares a "struct", then an analogous entity in JAVA would be a class as a struct type object is not supported in the JAVA programming language. Additionally, this new program code creates the object within a scope and context similar to that of the original expression. For example, if the original expression implicitly creates a temporary objection with an "if" expression, then the new source code likewise creates an object within an "if" expression. Further, in some embodiments, the new source code registers the newly created object using the tracking code discussed above in relation to block 814. Finally, program code is added to ensure that the object is destroyed at a time that is analogous to that of the temporary object in the original source code (block 812). In one embodiment, the new program code is included within a JAVA programming language "try" statement to ensure destruction of the object occurs. An example illustrating original source code and new source code according to this approach will be provided in FIG. 10.

In some embodiments, it may not be possible to generate code to track and destroy an object when deemed necessary based on identification of an implicitly created temporary object. For example, the target source language may have constraints that are not present in the original source language. As one example, the original source language may include code that implicitly creates a temporary object and a direct replacement of such code with an explicitly created object would result in a call to create the object before a call to a constructor of the base class. With regard to the JAVA programming language, nothing can be declared before a call of a constructor of a base class. In order to address such scenarios, embodiments are contemplated in which a pool of JavaCleaners are used as described below.

It is noted that the JAVA language specification indicates how arguments in a method are evaluated. In particular, the specification indicates that arguments are evaluated left to right such that each argument expression appears to be fully evaluated before any part of any argument expression to its right. Taking advantage of this property, it is possible to call a static function before any evaluation of arguments happens. This can be used in the following way:
1. The first argument is replaced with "JC$Push( ).forward(<arg1>)", where <arg1> is the first argument.
   JC$Push( ) is a public static method which creates a new JavaCleaner in a global stack of JavaCleaners and returns it. In various embodiments, the stack is global with regard to the function/method, but is local with regard to the corresponding thread.
   forward(<arg1>) is a method of JavaCleaner that takes one argument, does nothing, and returns the passed argument.
2. All arguments are processed to detect and track temporaries in them. JavaCleaner, created in (1), is used to track temporaries. To access JavaCleaner, the public static method JC$Top( ) is used.

3. After a call of a constructor of a base class, the public static method JC$Pop( ) is called to destroy the JavaCleaner created in (1) and remove it from the global stack of JavaCleaners.

Utilizing the above approach, the following code may be generated with the C++ program code illustrated first, followed by the newly generated JAVA program code.

language processing unit is configured to analyze C++ programming code. During analysis of this representation, a temporary object may be identified (block 904). If such a temporary object is not identified and analysis is not complete (block 930), analysis continues (block 902). Otherwise, if analysis is complete (block 930), then the new source code is output for storage on a storage device (block 940).

```
/*****************************************************************/
/******************************* C++ *****************************/
/*****************************************************************/
struct AAA
{
        ~AAA( ){ }
};
struct BBB
{
        BBB(AAA a) { }
        BBB(int First, AAA Second) { }
        BBB(int First, AAA Second, int Third) { }
};
// Class CCC copies parameter with type AAA to pass it to constructor of BBB
struct CCC : BBB
{
    CCC(AAA a) : BBB(a) { }
    CCC(int First, AAA Second) : BBB(First, Second) { }
    CCC(int First, AAA Second, int Third) : BBB(First, Second, Third) { }
};
/*****************************************************************/
/*************** JAVA corresponding to the above C++ **************/
/*****************************************************************/
// Class CCC copies parameter with type AAA to pass it to constructor of BBB
public class CCC extends BBB
{
        public CCC(AAA a)
        {
            // Argument "a" is passed to the forward method of created JavaCleaner
            // Argument "a" also is copied to the temporary, so that temporary
            // must be tracked. Tracking is done via call to JC$Top( ).track( )
            super(JC$Push( ).forward(JC$Top( ).track(new AAA(a))));
            JC$Pop( ); // At this point tracked copy of argument "a" is destroyed.
        }
        public CCC(int First, AAA Second)
        {
                // Argument "First" is passed to the forward method of
                // created JavaCleaner. Argument "First" doesn't require tracking,
                // so it is passed as is. Argument "Second" is copied to the temporary
                // which must be tracked. Tracking is done via call to JC$Top( ).track( ));
                super(JC$Push( ).forward(First), JC$Top( ).track(new AAA(Second))
                JC$Pop( ); // The tracked copy of argument "Second" is destroyed.
        }
        public CCC(int First, AAA Second, int Third)
        {
            // Argument "First" is passed to the forward method of created JavaCleaner
            // Argument "First" doesn't require tracking, so it is passed as is.
            // Argument "Second" is copied to the temporary which must be tracked.
            // Tracking is done via call to JC$Top( ).track( )
            // Argument "Third" doesn't require tracking, so it is passed as is.
                super(JC$Push( ).forward(First),   JC$Top( ).track(new   AAA(Second)),
                    Third);
                JC$Pop( ); // At this point tracked copy of argument "Second" is destroyed.
        }
}
```

Figure 9:
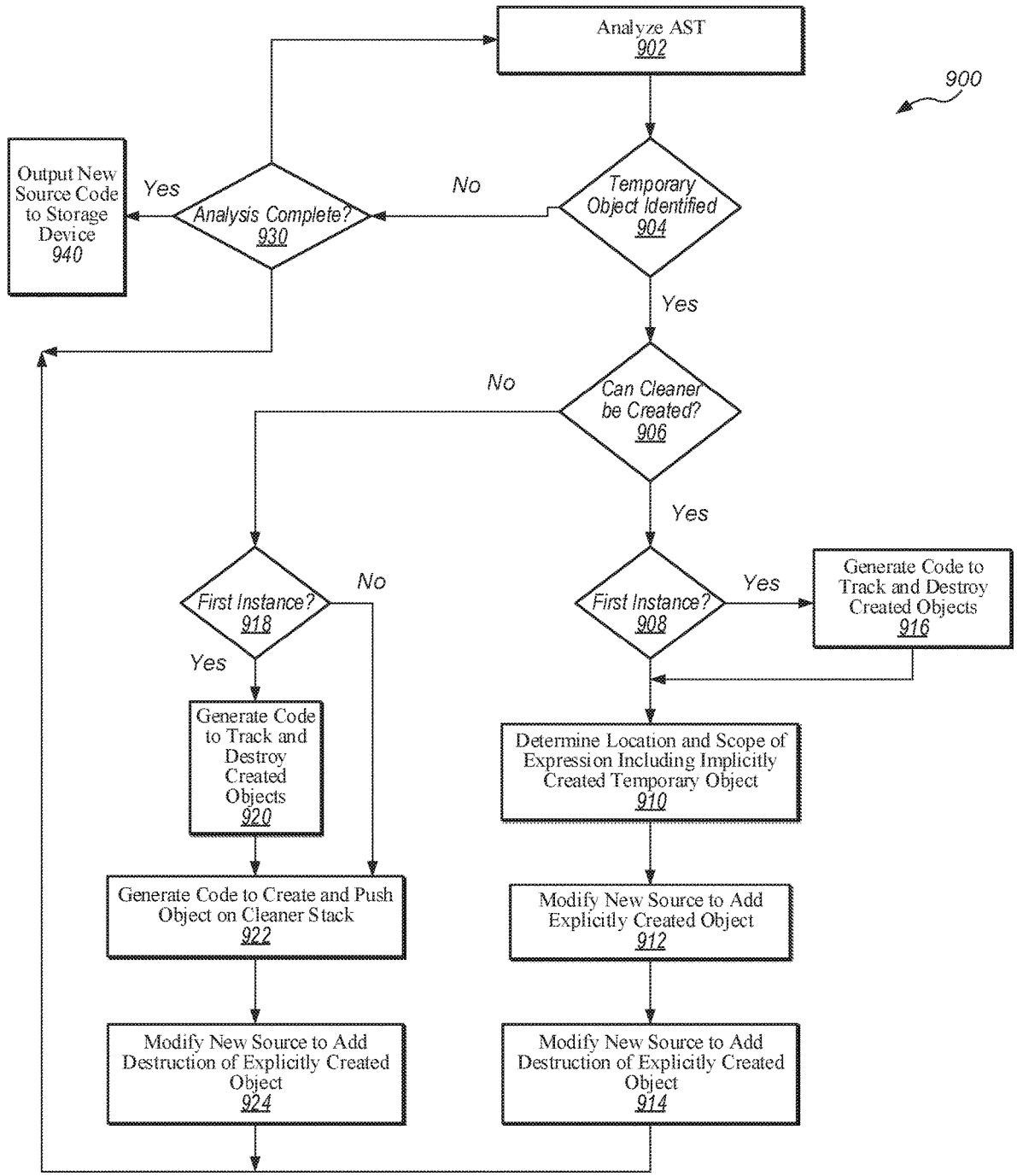
FIG. 9 illustrates one embodiment of a method for identifying temporary objects in original source code and modifying the translated source code to emulate the functionality of the temporary objects.

FIG. 9 illustrates one embodiment of a method 900 that uses the above approach to conditionally use a stack of JavaCleaners when converting C++ source code with implicitly created temporary objects to JAVA source code. In the embodiment shown, the abstract representation (e.g., an abstract syntax tree) generated by the source language processing unit (e.g., unit 106 of FIG. 1) is analyzed (block 902). In various embodiments, analysis may include other and/or different metadata associated with the processing of the original source code. In one embodiment, the source In the event a temporary object is identified (block 904), a determination may be made as to whether it is possible (block 906) to create a corresponding object within a call to clean( ) as discussed above. For example, in one embodiment it is not possible to create a corresponding object within a call to clean( ) if creation of the subexpression including the object to be created is of a void type. For example, in the sample code presented above the function foo( ) is of a void type and returns nothing. In such a case it is not possible to wrap a call of foo( ) with a call of then clean( ) method. If such is not possible, then a determination is made as to whether this is the first instance (block 918) of this type of temporary object. If it is, then code to track and destroy objects using a stack and pool of cleaners is generated (920). It is noted that it is not necessary to create the code of block 920 at this time. Rather, it may be created earlier in the process in anticipation that it will later be needed. Various such embodiments are possible and are contemplated.

After creating the code of block 920, code is generated to create the corresponding object and push the object (or a reference to the object) on the cleaner stack (block 922). In this manner, the object will be both created and tracked. In addition, new source code is generated to destroy the created object (block 924). This code is reflected above by the clean( ) method and the destroy( ) method (which may be used in the event the "try" fails.

If in block 906 it turns out that the cleaner can be created (e.g., the subexpression is of a void type), a determination is made as to whether this is the first instance (block 908) of this type of temporary object. If it is, then code to track and destroy objects is generated (916). If this is the first instance detected, then program code to track and destroy objects in the new source code is generated (block 814). It is noted that it is not necessary to create the code of block 916 at this time. Rather, it may be created earlier in the process in anticipation that it will later be needed. Various such embodiments are possible and are contemplated. This program code in the new source code is configured to track objects that are created to emulate temporary objects in the original source code. For example, the program code to track such objects may register an object when it is created. Registration of the object is maintained until such time as the object is destroyed. By reviewing objects that have been registered (e.g., in a list or other data structure), objects that remain alive can be identified and destroyed as needed. This code may serve to ensure objects are destroyed in the event an object otherwise fails to be destroyed due to an exception or other condition during program execution.

Subsequent to generating the tracking and destruction code (block 916), or if this is not the first instance of a temporary object (block 908), the location, scope, and context of the expression that results in the creation of the temporary object is determined through analysis of the above described abstract representation and/or other metadata (block 910). Having determined the location, scope, and context of the expression in the original source code, the new source code is modified at a corresponding location by adding program code to explicitly create an object (block 912) most closely resembling the temporary object type. That is to say, the explicitly created object in the new source code is of a type most closely analogous to that of the original temporary object. For example, if original C++ source code declares a "struct", then an analogous entity in JAVA would be a class as a struct type object is not supported in the JAVA programming language. Additionally, this new program code creates the object within a scope and context similar to that of the original expression. For example, if the original expression implicitly creates a temporary objection with an "if" expression, then the new source code likewise creates an object within an "if" expression. Further, in some embodiments, the new source code registers the newly created object using the tracking code discussed above. Finally, program code is added to ensure that the object is destroyed at a time that is analogous to that of the temporary object in the original source code (block 914). In one embodiment, the new program code is included within a JAVA programming language "try" statement to ensure destruction of the object occurs. An example illustrating original source code and new source code according to this approach will be provided in FIG. 10.

In various embodiments, if the lifespan of a temporary object is prolonged via a C++ const type reference, then the process that references the object as a variable should be destroyed. Generally speaking, C++ specifies that temporary objects bound to a const reference lengthen the lifetime of the temporary object. The following code samples illustrate embodiments for managing such scenarios.

```
/*************************************************************/
/****************************** C++ **************************/
/*************************************************************/
struct AAA
{
  ~AAA( ) { }
};
static void foo( )
{
  const AAA &Ref = AAA( );   // const results in lengthened lifetime
}
/*************************************************************/
/*************** JAVA corresponding to the above C++ **************/
/*************************************************************/
public static void foo( )
{
    /*const*/ AAA /*&*/ Ref = null;
    try
    {
        /*final */ Ref = new AAA( );
    }
    finally
    {
        // If Ref is not null, the life of the object has been extended. Therefore,
        // explicitly destroy the object with a call to destroy( )
            if (Ref != null) { Ref.$destroy( ); }
    }
}
```

Figure 10:
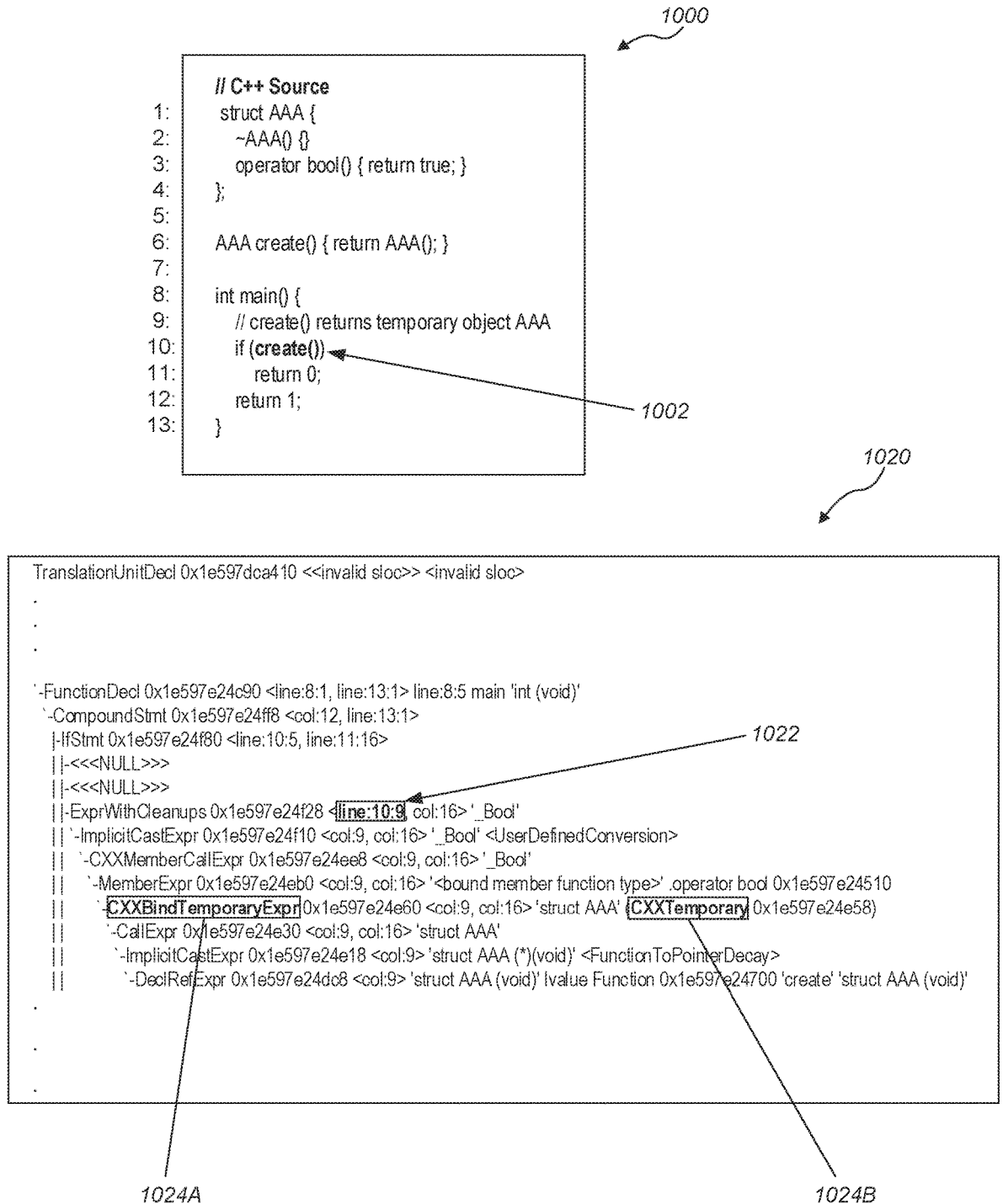
FIG. 10 illustrates one embodiment of original source code and a portion of a corresponding abstract syntax tree.

As discussed above, in one embodiment a frontend type tool is used to generate an abstract representation of the original source code that may then be analyzed (e.g., in block 802 of FIG. 8 and block 902 of FIG. 9). Turning to FIG. 10, one embodiment of such an abstract representation (1020) is shown. In the example of FIG. 10, sample original C++ source code 1000 is illustrated that is analyzed by a frontend type tool. In this example, the embodiment utilizes the Clang frontend tool to generate an abstract syntax tree (AST) 1020. Because in C++ temporary objects are created with calls to appropriate constructors or conversion operators, the AST built from the original C++ source code contains calls to these operators which can be identified. While an example based on a Clang AST is provided, those skilled in the art will appreciate that other tools may generate different abstract representations with identifiable elements. Nevertheless, such other representations may be analyzed in a manner similar to that discussed in FIG. 10.

In the embodiment of FIG. 10, the original C++ source code includes a statement 1002 in which a temporary object is created. As seen in the example, the C++ program code includes the expression "if (create( ))" at line 10. In this example, the call to create( ) returns a temporary object "AAA" because it is not assigned to any variable. Additionally, the temporary object has a lifecycle bound to the expression in which it is create (inside the if-statement). A portion of the AST generated for the program code 1000 is shown in block 1020. As can be seen, while processing line 10 of the original source code (1022) that includes the "create( )" statement, particular keywords are identified that indicate the creation of a temporary object. For example, the keyword "CXXBindTemporaryExpr" (1024A) represents a class used for binding an expression to a temporary object. It is noted that "CXXBindTemporaryExpr" is a convention used by Clang. Other tools may use different conventions for identifying temporary objects that can be identified through analysis. Also, the keyword "CXXTemporary" is a keyword indicating a class that represents a C++ temporary object. In other embodiments, keywords other than the above may be used. Such other keywords and conventions will either be documented or otherwise identifiable by those skilled in the art. Based on the identification of creation of a temporary object in the AST, and the expression within which it is created, corresponding new source code may be generated.

FIG. 11 provides an illustration of both original source code 1100 and a portion of the converted source code 1120 generated according to the above described approach(es). In the illustrated original source code 1100, an "if" statement (1104A) appears with the above discussed call to create( ) which results in the creation of a temporary object. The lifetime of this temporary object in C++, as known to those skilled in the art, is within the "if" expression itself. In the sample converted code 1120, a main( ) (1102B) is generated that corresponds to the original main( ) (1102A) of the original code 1100. Likewise, the original source "if" statement 1104A has a corresponding "if" statement (1104B) in the newly generated source code.

As can be seen, the original create( ) statement returns an AAA value used as a "bool" in the if-statement. Consequently, the newly generated create( ) likewise includes a definition such that a Boolean value is returned. For ease of illustration, the definition of the JAVA class AAA the corresponds to the original C++ struct AAA is not shown. In the example shown, the create( ) call is encompassed within tracking and registering code. Other embodiments may not embed the create( ) in this manner and may simply use a more straightforward call capable of returning a Boolean value. Such might be the case in an embodiment that does not utilize the above discussed tracking and destruction program code that may be generated. In the example shown (1104B), the call to create( ) is evaluated first within the expression and results in the creation of an AAA object that is analogous to the original AAA struct. The return value of the create( ) which is the object itself in this example, is passed as a parameter to track( ) which is configured to register the creation of the object AAA. In various embodiments, registration of the object may include adding the object (or identification of the object) to a linked list or other data structure. Upon successful registration of the object, the function (or method) $bool( ) of the temporary object itself is called which returns a Boolean value of true. The result of track( ) is then passed to the clean( ) function which is configured to destroy the newly created object. In this manner, the lifetime of the object is analogous to that of the temporary object in the original source code (i.e., within the if expression). Finally, a return value of 0 is generated in the new source code to duplicate the original source code.

As discussed above, additional destruction code may be added to the new source code to ensure that created objects are destroyed at the appropriate time. If for example, an exception or other event occurs during execution of the "if" statement 1104B, then it is possible that the object was created but not destroyed. The continued existence of such an object may result in undesirable side effects which in turn results in a functional non-equivalence of the new source code. In order to address such a possibility, in one embodiment the creation of an object to emulate a temporary object is placed within a JAVA programming language "try" block (1132). As known to those skilled in the art, such a try block is used for handling exceptions. In the present case, the entirety of the expression representing the lifetime of the created object is placed within the try block. To ensure that a proper call to destroy the newly created object is made, the try block includes a "finally" block (1134) with a call to destructor code (i.e., destroy( )). The destructor code is code that was generated, for example, in association with block 814 of FIG. 8 or blocks 916 and 920 of FIG. 9.

Figure 12:
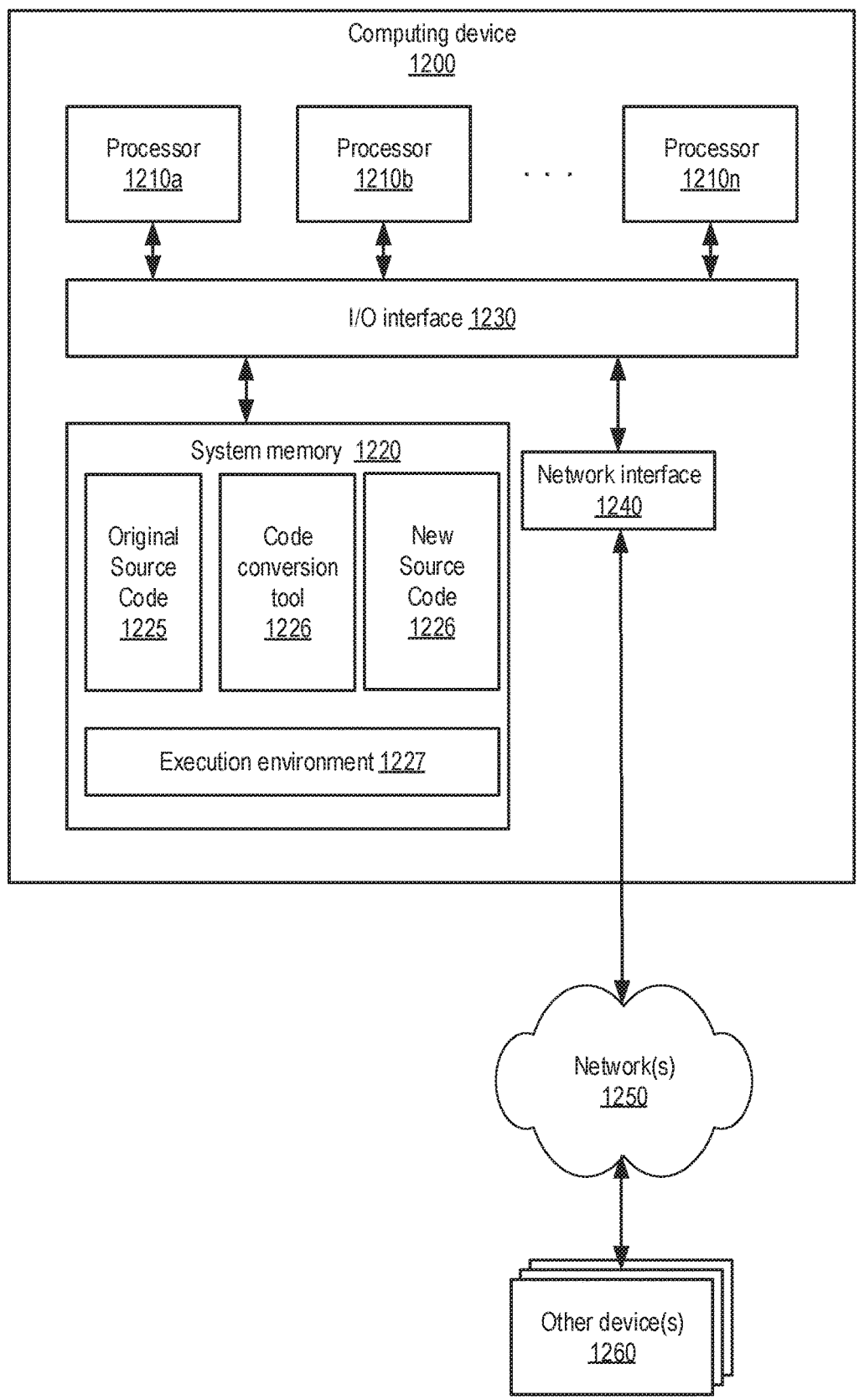
FIG. 12 is a block diagram illustrating a computing device configured to analyze and translate source code according to at least some embodiments.

FIG. 12 is a block diagram illustrating a computing device 1200 configured to implement a code conversion tool with support for identifying refactoring options of the kind described above, according to at least some embodiments. The computer device 1200 may correspond to any of various kinds of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any kind of computing device. In the illustrated embodiment, computing device 1200 includes one or more cores or processors 1210 (or "processing unit") coupled to a system memory 1220 via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several cores or processors 1210 (e.g., two, four, eight, or another suitable number). Processors 1210 may be any suitable processors capable of executing instructions. For example, in various embodiments, processors 1210 may including circuitry designed as general-purpose or embedded processors implementing any of a variety of instruction set architectures (ISAs), such as the SPARC, x86, PowerPC, or MIPS ISAs, or any other suitable ISA. In multiprocessor systems, each of processors 1210 may commonly, but not necessarily, implement the same ISA.

System memory 1220 may be configured to store program instructions implementing a code conversion tool 1226, original source code 1225, and new source code 1226 generated by the code conversion tool 1226, and an execution environment 1227 (e.g., a JAVA virtual machine). System memory may also include program instructions and/or data for various other applications. Program instructions may be encoded in platform native binary, any interpreted language such as JAVA bytecode, or in any other language such as C/C++, JAVA, etc. or in any combination thereof. In various embodiments, system memory 1220 may be implemented using any suitable memory technology, such as static random access memory (SRAM), synchronous dynamic RAM (SDRAM), nonvolatile/Flash-type memory, or any other kind of memory.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIG. 1 through 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic, or digital signals, conveyed via a communication medium such as a network and/or a wireless link, which may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory, computer-readable storage medium storing program instructions that when executed on a computing device cause the computing device to perform:
   receiving, by a source language processing tool, a command to process first source code in a first high level language;
   accessing, by the source language processing tool, the first source code in the first high level language responsive to said command;
   analyzing, by the source language processing tool, the first source code in the first high level language;
   generating, by the source language processing tool, a data structure representative of the first source code in the first high level language;
   analyzing, by a code conversion tool, the data structure to determine whether there exists program code in the first source code to create temporary objects;
   responsive to identifying program code in the first source to create a given temporary object, generating corresponding program code in a second source code to explicitly create an object that corresponds the given temporary object; and
   outputting the second source code of the second high level language to a storage device.

2. The non-transitory computer-readable storage medium as recited in claim 1, wherein identifying the program code in the first source to create a given temporary object further comprises identifying a scope within which the given temporary objects exist, said scope including a first point at which the given temporary object begins existence and a second point at which the given temporary object ceases to exist.

3. The non-transitory computer-readable storage medium as recited in claim 2, wherein generating the corresponding program code in the second source code to explicitly create the object that corresponds to the given temporary object comprises:
   generating code to explicitly create the object in the second source code; and
   generating code to destroy the object in the second source code.

4. The non-transitory computer-readable storage medium as recited in claim 3, wherein the program instructions that when executed on a computing device further cause the computing device to perform:
   generating code in the second source code to register creation of explicitly created objects in the second source code that correspond to temporary objects in the first source code; and
   generating code in the second source code to identify explicitly created objects in the second source code that have been registered and confirm their destruction.

5. The non-transitory computer-readable storage medium as recited in claim 1, wherein responsive to determining said given temporary object is created within a subexpression of a first type, generating the corresponding program code in the second source code to explicitly create the object that corresponds to the given temporary object within a call to code configured to track and destroy the explicitly created object.

6. The non-transitory computer-readable storage medium as recited in claim 5, wherein responsive to determining said given temporary object is created within a subexpression of a second type different from the first type:
   generating, at a first location, the corresponding program code in the second source code to explicitly create the object to represent the given temporary object within a call to code configured to track and destroy the explicitly created object; and
   generating, at a second location following the first location, program code in the second source code to destroy the explicitly created object.

7. The non-transitory computer-readable storage medium as recited in claim 6, wherein the first type is a non-void return type and the second type is a void return type.

8. A computer implemented method for converting source code from a first high level language to a second high level language, wherein said method comprises:
   a computing device comprising circuitry:
      receiving, by a source language processing tool, a command to process first source code in a first high level language;
      accessing, by the source language processing tool, the first source code in the first high level language responsive to said command;
      analyzing, by the source language processing tool, the first source code in the first high level language;
      generating, by the source language processing tool, a data structure representative of the first source code in the first high level language;
      analyzing, by a code conversion tool, the data structure to determine whether there exists program code in the first source code to create temporary objects;
      responsive to identifying program code in the first source to create a given temporary object, generating corresponding program code in the a second source code to explicitly create an object of an analogous type as that corresponds to the given temporary object; and
      outputting the second source code of the second high level language to a storage device.

9. The computer implemented method as recited in claim 8, wherein identifying the program code in the first source to create a given temporary object further comprises identifying a scope within which the given temporary objects exist, said scope including a first point at which the given temporary object begins existence and a second point at which the given temporary object ceases to exist.

10. The computer implemented method as recited in claim 9, wherein generating the corresponding program code in the second source code to explicitly create the object that corresponds to the given temporary object comprises the computing device:
    generating code to explicitly create the object in the second source code; and
    generating code to destroy the object in the second source code.

11. The computer implemented method as recited in claim 10, wherein the program instructions that when executed on a computing device further cause the computing device to perform:
    generating code in the second source code to register creation of explicitly created objects in the second source code that correspond to temporary objects in the first source code; and
    generating code in the second source code to identify explicitly created objects in the second source code that have been registered and confirm their destruction.

12. The computer implemented method as recited in claim 8, wherein responsive to determining said given temporary object is created within a subexpression of a first type, the method comprises the computing device generating the corresponding program code in the second source code to explicitly create the object that corresponds to the given temporary object within a call to code configured to track and destroy the explicitly created object.

13. The computer implemented method as recited in claim 12, wherein responsive to determining said given temporary object is created within a subexpression of a second type different from the first type, the method comprises the computing device:
    generating, at a first location, the corresponding program code in the second source code to explicitly create the object that corresponds to the given temporary object within a call to code configured to track and destroy the explicitly created object; and
    generating, at a second location following the first location, program code in the second source code to destroy the explicitly created object.

14. The computer implemented method as recited in claim 13, wherein the first type is a non-void return type and the second type is a void return type.

15. A computing device comprising:
    one or more processing units; and
    a storage device;
    wherein at least one of the one or more processing units is configured to:
       receive, by a source language processing tool, a command to process first source code in a first high level language;

access, by the source language processing tool, the first source code in the first high level language responsive to said command;

analyze, by the source language processing tool, the first source code in the first high level language;

generate, by the source language processing tool, a data structure representative of the first source code in the first high level language;

analyze, by a code conversion tool, the data structure to determine whether there exists program code in the first source code to create temporary objects;

responsive to identifying program code in the first source to create a given temporary object, generate corresponding program code in the second source code to explicitly create an object that corresponds to the given temporary object; and store the second source code of the second high level language on the storage device.

16. The computing device as recited in claim 15, wherein to identify the program code in the first source to create a given temporary object, the at least one processing unit is further configured to identify a scope within which the given temporary objects exist, said scope including a first point at which the given temporary object begins existence and a second point at which the given temporary object ceases to exist.

17. The computing device as recited in claim 16, wherein to generate the corresponding program code in the second source code to explicitly create the object that corresponds to the given temporary object, the at least one processing unit is configured to:

generate code to explicitly create the object in the second source code; and generate code to destroy the object in the second source code.

18. The computing device as recited in claim 17, wherein the at least one processing unit is further configured:

generate code in the second source code to register creation of explicitly created objects in the second source code that correspond to temporary objects in the first source code; and generate code in the second source code to identify explicitly created objects in the second source code that have been registered and confirm their destruction.

19. The computing device as recited in claim 15, wherein responsive to determining said given temporary object is created within a subexpression of a first type, the at least one processing unit is configured to generate the corresponding program code in the second source code to explicitly create the object that corresponds to the given temporary object within a call to code configured to track and destroy the explicitly created object.

20. The computing device as recited in claim 19, wherein responsive to determining said given temporary object is created within a subexpression of a second type different from the first type, the at least one processing unit is configured to:

generate, at a first location, the corresponding program code in the second source code to explicitly create the object that corresponds to the given temporary object within a call to code configured to track and destroy the explicitly created object; and generate, at a second location following the first location, program code in the second source code to destroy the explicitly created object.

* * * * *

UNITED STATES PATENT AND TRADEMARK OFFICE
CERTIFICATE OF CORRECTION

PATENT NO. : 10,545,743 B2  
APPLICATION NO. : 15/706297  
DATED : January 28, 2020  
INVENTOR(S) : Kudriavtsev et al.

Page 1 of 1

It is certified that error appears in the above-identified patent and that said Letters Patent is hereby corrected as shown below:

In the Specification

In Column 5, Line 57, after "code" insert -- . --.

In Column 6, Lines 23-24, after "from the" delete "of the".

In Column 22, Line 7, delete "create( )" and insert -- create( ), --, therefor.

In the Claims

In Column 26, Line 1, in Claim 8, delete "the a" and insert -- a --, therefor.

In Column 26, Lines 2-3, in Claim 8, after "object" delete "of an analogous type as".

Signed and Sealed this  
Twenty-seventh Day of October, 2020

Andrei Iancu  
*Director of the United States Patent and Trademark Office*